Patented Apr. 22, 1947

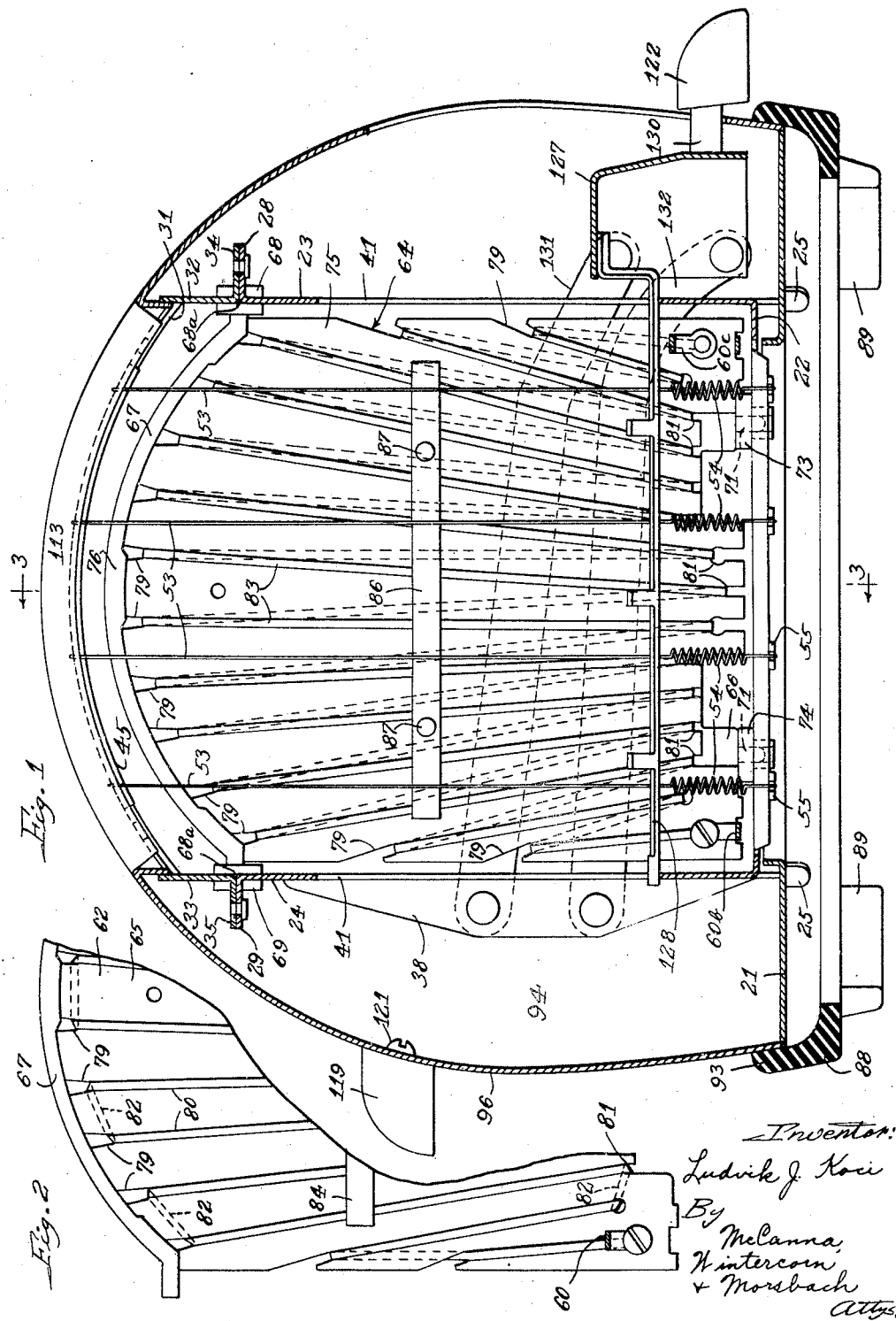

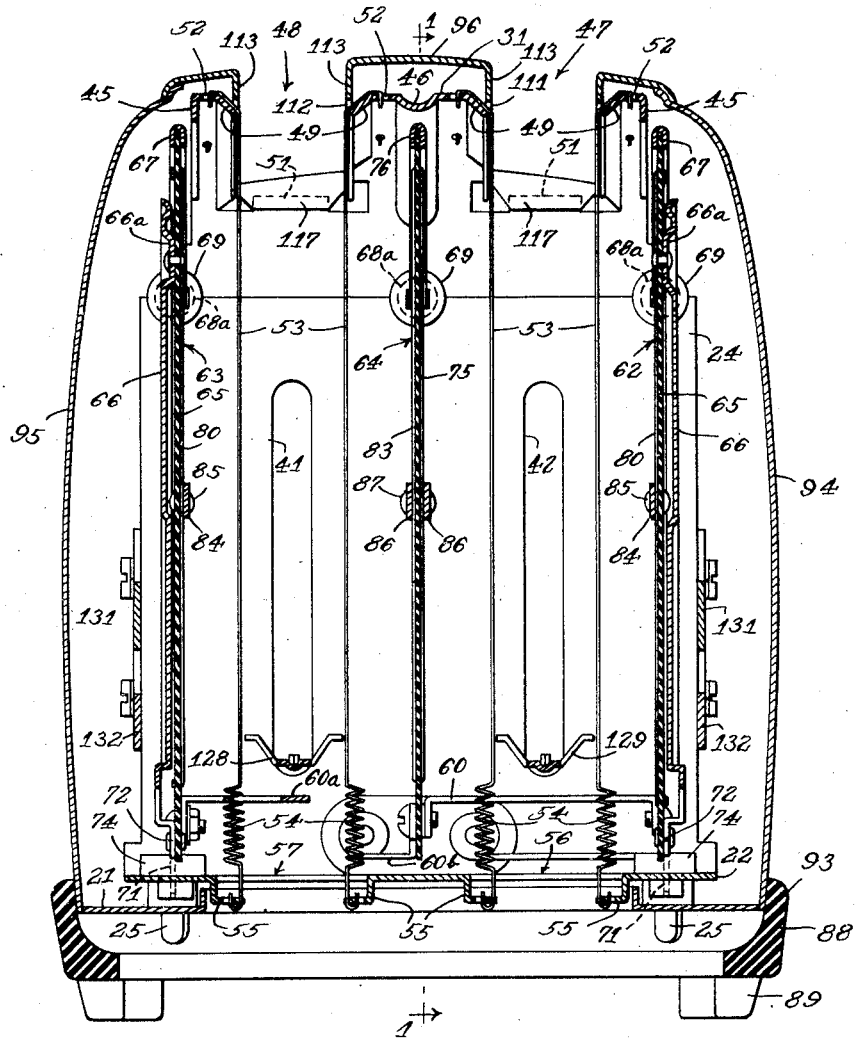

2,419,355

UNITED STATES PATENT OFFICE 2,419,355

ELECTRIC TOASTER HEATING UNIT

Ludvik J. Koci, Chicago, Ill., assignor to Sunbeam Corporation, Chicago, Ill., a corporation of Illinois Original application June 26, 1939, Serial No. 281,080, now Patent No. 2,271,485, dated January 27, 1942. Divided and this application December 26, 1941, Serial No. 424,378

1 Claim. (Cl. 219—19)

This is a division of my application Serial No. 281,080, filed June 26, 1939 and issued January 27, 1942 as Patent No. 2,271,485, for Toaster.

The present invention relates to electric toasters and has more particular reference to the toaster heating elements and to the means for supporting such elements.

The primary object is to provide improved means for applying heat to the bread slice or slices for the purpose of obtaining uniform toasting of the bread surfaces. To this end my invention contemplates an improved heating element characterized by a web of resistance wires extending upwardly and in outwardly diverging relation so that the emittance of heat per unit area at the bottom portion of the element is greater than at the top portion and the arrangement produces the desired uniform toasting effect.

Another object is to provide a toaster heating element so constructed as to avoid the tendency of bread crumbs to catch or clog on the resistance wires.

Another object is to provide an improved toaster heating element and improved means of supporting the element.

Another object is to provide a toaster heating element of generally improved construction which will have longer life and be capable of economical manufacture.

Still another object is to provide an electric toaster having heating elements supported in improved cooperative relation one with respect to the other for the purpose of improving the toasting efficiency.

Other objects and attendant advantages will appear from the following description and the accompanying drawings, in which—

Figure 1 is a longitudinal vertical section through an electric toaster embodying my invention, showing the center toaster heating element in side elevation;

Fig. 2 is a side elevation of a fragmentary portion of one of the side heating elements; and Fig. 3 is a transverse section taken substantially on the section line 3—3 of Figure 1, it being noted that Figure 1 is taken substantially on the section line 1—1 of Fig. 3.

In illustrating my invention and the manner of its use I have shown a toaster of the two-slice type particularly adapted for use in the home. The general construction here disclosed corresponds with that disclosed in my above mentioned application. No attempt has been made in the present case to show means for controlling the toasting interval, means for this purpose being well known in the art. Also, it should be understood that the improvements herein claimed are intended for application in any electric toaster structure not inconsistent with the invention. The present disclosure is intended, therefore, as an illustrative case.

The operating elements of the toaster are supported essentially upon a base plate 21 carried in the casing in a manner presently to be described. Positioned on this plate is a U-shaped frame having a bottom portion 22 parallel with the base plate 21 and upstanding end members 23 and 24. The frame member is secured to the base plate by a plurality of fingers 25 which extend through slots in the base plate and have their ends offset from the plate of the slot so as to prevent their removal. Spaced ears 28 and 29 are formed on the upper ends of the end members 23 and 24 and project laterally outward. The upper ends of the end members are secured together by a bridge member 31 having vertically disposed end portions 32 and 33 provided with spaced ears 34 and 35 positioned to register with the ears 28 and 29 and suitably connected thereto to secure the bridge member and the end members together. The side edges of the end member 24 are provided with flanges 38 (only one of which is shown) for the pivotal support of bread carrying mechanism presently to be described and the plates 23 and 24 are provided with suitable slots 41 for the passage of bread transporting mechanism. The bridge member 31 is provided with a depending stiffening flange 45 on each edge thereof and with a centrally disposed stiffening rib 46. This bridge member is also provided with spaced slots as shown at 47 and 48, the side edges of each slot being beveled downwardly as shown at 49. Upstanding tongues 51 are positioned at each end of each of the slots 47 and 48 for engagement with the casing, as will presently appear. Spaced openings 52 are positioned along each side of the slots 47 and 48 and serve to receive toast guide wires 53 formed of spring wire, the wires having their upper ends hooked into the openings 52 and being trained over the beveled edges 49 (Fig. 3). These wires are of relatively small diameter and small mass so as not to materially obstruct the radiation of heat from the heating element to the sides of the slice of bread and to heat up at substantially the same rate as the bread, which slices are inserted through the openings 47 and 48 in a manner presently to be described and so that the presence of these wires will not produce a shadow on the surface of the toast. The wires extend downwardly, and adjacent their lower ends have coils formed therein as shown at 54, the coils forming in effect coiled springs which act to maintain the wires taut. The lower ends of the wires are passed through openings in laterally projecting tabs 55 positioned on opposite sides of slots 56 and 57 formed in the bottom member 22.

Three heating elements are employed, in this instance designated generally by the numerals 62, 63 and 64, the elements 62 and 63 being substantially identical and comprising a sheet of insulation material 65 of mica or the like, to one side of which is attached, in spaced relation, a thin sheet of heat reflective metal such as aluminum, as shown at 66, dents and ribs 66a serving to space the main body of the sheet from the mica at the top thereof. These sheets 66 cover substantially the entire area of the side elements and the upper arcuate edge of the mica sheet is bound by a U-shaped strip of reinforcing metal 67, the ends thereof projecting beyond the mica sheet and being inserted in porcelain insulators 68 and 69 secured between the end members 23 and 24 and the bridge member 31. Each insulator 68 and 69 preferably has an annular groove 68a in its periphery to receive complementary notched out portions of the end members 23 and 24 and the bridge member 31 at their juncture shown in Fig. 3. At the lower edge of the heating element the plate 66 has depending tabs 71 seated in insulators 73 and 74, which insulators are in turn seated in the bottom member 22, the heating element thus being supported on the frame structure by means of the insulators 68, 69, 73 and 74. The central heating element 64 comprises a mica sheet 75 which likewise has a binding strip 76 at its upper edge, the ends of which are seated in insulators 68 and 69 seated between the end members and the bridge member, similar to the insulators for the elements 62 and 63. The central heating element is held in position against lateral displacement by suitable means such as bus bars 60, 60a, 60b and 60c, the bus bars 60b and 60c being connected to the end members 23 and 24, respectively, (these connections not being shown on the drawings). In this case the heating elements are in one circuit, the terminals of which are the bus bars 60b and 60c. The upper and side edges of each of the mica sheets 65 and 75 are provided with a plurality of notches as shown at 79 and along the lower edge thereof is a series of notches 81 within which notches is carried a winding of ribbon-like resistance wire, the wire being trained in loops between the notches 79 and 81. In the case of the heating elements 62 and 63 the resistance wire extends only across one face of the sheets 65, as shown at 80, and extends across the back of the mica sheet between adjacent notches 79 and adjacent notches 81 as shown at 82 (Fig. 2). In the case of the heating element 64, the loops 83 of the resistance wire are wound completely around the mica sheet 75 so as to produce spaced strands on opposite sides thereof. The notches are so positioned that the distance between the notches 79 is substantially greater than the distance between the notches 81 so that the strands spread as they extend upwardly to produce a sunburst effect. Through this means the radiant heat imparted to the surface of the slice of bread is given uniformity and compensation is produced for the effect of the rising heat on the bread. The strands of resistance wire 80 are held against the mica sheet intermediate their ends in the heating elements 62 and 63 by a transverse bar of mica 84 secured to the inner face of the sheet 65 by rivets 85. This construction of the heating element has a number of important advantages in that it greatly reduces the tendency of the resistance wire to fall away from the sheet of insulation, and in the case of the center toasting elements eliminates the necessity for a double sheet of insulation. The central heating element has horizontal binding strips 86 on its opposite sides secured together by rivets 87 acting to hold the strands of resistance wire against undue sagging. Because of the vertical arrangement of the resistance wires, these binding strips may be horizontally positioned, which eliminates the tendency for the strips to produce shadows on the toast.

The movable parts of the toaster, aside from the manually operated handles, are enclosed within a casing to form, in effect, an oven enclosed by the U-shaped frame, and end chambers at opposed ends of the oven. This casing includes a base designated generally by the numeral 88, in this instance formed of a form of synthetic resin such as "Bakelite" or the like. The base 88 is provided with a plurality of depending legs 89 for the purpose of supporting the toaster in spaced relation to the table or other structure on which it is placed and is secured to the base plate 21 by suitable means such as screws (not shown). The upper side of the base member has an upwardly disposed peripheral flange 93 extending above the edge of the base plate 21 to conceal the junction between the base plate and the side walls. The side walls comprise two formed sheet metal side members 94 and 95 and a central or intermediate member 96 which extends in an arcuate fashion from end to end of the base 88 as will be seen from Fig. 1. The central casing member is provided with slots 111 and 112 registering with the slots 47 and 48 for the passage of the bread into and out of the toaster, these slots having marginal side flanges 113 for the purpose of concealing the upper ends of the guide wires 53 and the upper surface of the bridge member. The slots 111 and 112 also have depending marginal end flanges 117 which are positioned to engage against the upstanding tongues 51 to prevent endwise displacement of the central portion 96 through its intermediate area and to generally rigidify the toaster construction. A fixed handle 119 is secured to the central casing portion 96 by means of a screw 121, the handle being preferably formed of Bakelite or other insulation material and being complementary to a movable handle 122 at the opposite end of the toaster, the latter of which functions in the bread inserting and removing mechanism, as will presently appear.

Positioned at one end of the oven and within the casing is a cross-head designated generally by the numeral 127 to which is attached a pair of bread holders 128 and 129 which extend through the openings 41 and 42 into the spaces between the heating elements, the free ends thereof extending out of the chamber through said openings. The handle 122 is carried on the cross-head 127 by means of a bar 130 which passes through a slot in the intermediate casing 96 for manual movement of the cross-head by means of the handle. The cross-head is supported for movement between an upper bread inserting position and a lower toasting position shown in Fig. 1 by means of parallel links 131 and 132 arranged in pairs along opposite sides of the frame. One end of each of the parallel links is pivotally secured to the cross-head 127, and the opposite ends of links are pivotally supported on the flanges 38. Bread slices inserted through the slots 47 and 48 will be supported on the bread holders 128 and 129 in a position between the spacing or guiding wires 53 which locate or determine the position of the bread slices laterally with respect to the heating elements. Ordinarily the bread slices are inserted when the bread holders are in the upper position and by pressing down on the handle 122 the holders are moved to the full line position shown in the drawings to place the bread in the toasting position. This showing of bread holders is merely for purpose of illustrating a suitable means for supporting the bread slices in toasting position with relation to the heating elements. Obviously, any means may be employed for this purpose whether stationary or movable and, if desired, means may be employed in conjunction with the bread holders, or otherwise, to automatically eject the bread slices at the end of the toasting interval. Although, no means is shown in this case for controlling the toasting interval my improvements are particularly well adapted for toasters having such control.

Attention is directed to the novel features of the invention, among which should be noted the novel construction of toasting elements wherein the resistance wires are arranged in what might be termed a sunburst fashion, the wires diverging from bottom to top of the toasting element to produce uniform toasting effect throughout the width and height of the toast. More particularly, this winding of the resistance wires closer together at the bottom than at the top in the arrangement shown gives a proportionally greater emittance of heat per unit area at the bottom portion of each element than at the top portion. This arrangement produces a predetermined heat emission gradient from bottom to top and serves to produce uniform toasting of the bread surface due to the fact that convection carries some of the heat delivered by the bottom portion of the element to portions of the bread surface above those lower portions opposite which the heat is emitted. Another feature is the almost vertical arrangement of the resistance wires for the purpose of avoiding the tendency for bread crumbs to be caught and lodged between the wires and the mica sheet. Accumulation of bread crumbs on the element is objectionable and may result in faulty toasting, or burning out of the element, or impairing its efficiency. Furthermore, this construction, together with a transverse bar of insulation as a retaining means for the vertically disposed strands of resistance wire, greatly reduces the tendency of the wires to fall away from the insulation sheet as a consequence of heating.

Another feature is the mounting of the element assemblies through ceramic pieces or insulators, thereby enabling the use of cheaper and structurally superior but electrically inferior bonded mica sheets. It will be apparent, therefore, that the disclosed construction permits economy in cost of manufacture and at the same time gives a high safety factor in adequately insulating the current carrying parts relative to the outside shell or casing structure of the toaster.

Other features are the provision of a center element wound on a single insulation sheet as compared with prior practice of using plural part insulation sheets and individual windings thereon; the arrangement of center and side heating elements with aluminum reflectors or the like associated with the side reflectors and serving as supports therefor; and the provision of current carrying bus bars as a means of lateral support for the center heating element.

While I have described and illustrated a specific embodiment of the invention, this is by way of illustration and not limitation, and I do not wish to be limited except as required by the prior art and the scope of the appended claim, in which—

I claim:

An electric toaster having a toasting compartment, a heating element therein comprising a sheet of insulation material, a resistance wire wound on the sheet, a binding strip on the upper edge of the sheet projecting beyond both sides thereof, an insulation block on each projecting end of said strip, depending tabs on the bottom of the sheet, stationary insulation blocks in the bottom of the toasting compartment adapted to receive the tabs for locating the heating element in the compartment, and means in the compartment at the sides thereof for receiving the first mentioned insulation blocks to provide support for the heating element, said parts being constructed and arranged so that the heating element is removable and replaceable as a unit with respect to said stationary insulation blocks.

LUDVIK J. KOCI.

REFERENCES CITED

The following references are of record in the file of this patent:

UNITED STATES PATENTS

| Number | Name | Date |
|---|---|---|
| 1,102,393 | Denhard | July 7, 1914 |
| 1,241,578 | Thornton | Oct. 2, 1917 |
| 1,734,611 | Chandler | Nov. 5, 1929 |
| 2,106,824 | Bayne | Feb. 1, 1938 |
| 2,151,105 | Hendershot | Mar. 21, 1939 |
| 1,963,409 | Johnson | June 19, 1934 |
| 2,001,362 | Ireland | May 14, 1935 |
| 2,070,129 | Ireland | Feb. 9, 1937 |